(12) United States Patent
Morton et al.

(10) Patent No.: US 9,530,117 B2
(45) Date of Patent: Dec. 27, 2016

(54) METHOD AND APPARATUS FOR TRANSFORMING USER REQUESTS AND RESPONSES BASED ON A PERSONA

(75) Inventors: Michael J. Morton, Cary, NC (US); Goss F. Nuzzo-Jones, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 11/674,231

(22) Filed: Feb. 13, 2007

(65) Prior Publication Data

US 2008/0195711 A1    Aug. 14, 2008

(51) Int. Cl.
| | |
|---|---|
| *G06F 15/16* | (2006.01) |
| *G06Q 10/10* | (2012.01) |
| *H04L 12/58* | (2006.01) |

(52) U.S. Cl.
CPC ............ *G06Q 10/107* (2013.01); *H04L 12/58* (2013.01); *H04L 51/04* (2013.01); *H04L 51/063* (2013.01); *H04L 51/18* (2013.01)

(58) Field of Classification Search
CPC .. H04L 12/581; H04L 12/582; H04L 12/5815; H04L 69/14; H04L 65/4007; H04L 51/04; H04L 51/36; H04L 67/24; H04L 12/58; H04L 51/063; H04L 51/18; G06Q 10/107
USPC ......... 709/206, 204, 207; 370/260; 715/758, 715/759; 707/770
See application file for complete search history.

(56) References Cited

U.S. PATENT DOCUMENTS

| | | | |
|---|---|---|---|
| 6,199,099 B1 | 3/2001 | Gershman et al. ........... 709/205 |
| 6,952,716 B1 | 10/2005 | Robb et al. .................. 709/203 |
| 7,526,563 B2 * | 4/2009 | Ingimundarson et al. ... 709/230 |
| 7,623,476 B2 * | 11/2009 | Ravikumar ........... H04L 67/104 370/260 |
| 7,631,266 B2 * | 12/2009 | Werndorfer ............. G06F 3/167 715/752 |
| 7,650,342 B2 * | 1/2010 | Sugiyama .............. G06Q 30/02 705/1.1 |
| 7,908,554 B1 * | 3/2011 | Blattner ............... G06Q 10/107 715/706 |
| 8,027,276 B2 * | 9/2011 | Nierhaus ....................... 370/260 |
| 8,122,051 B2 * | 2/2012 | Spring .............. G06F 17/30056 707/732 |

(Continued)

FOREIGN PATENT DOCUMENTS

KR    2004017547    8/2002    ............. G06F 19/00

OTHER PUBLICATIONS

S. Pack et al., "Design of SIP Transformation Server for Efficient Media Negotiation," International Society for Optical Engineering, vol. 4522, p. 31-41, 2001, Seoul Nat. University, South Korea.

(Continued)

*Primary Examiner* — Thu Ha Nguyen
(74) *Attorney, Agent, or Firm* — Steven M. Greenberg, Esq.; CRGO Law

(57) ABSTRACT

A Persona Based Interface associates a user's persona with a simple instant message request to a remote service. When the Persona Based Interface receives a simple instant message request from a user, the Persona Based Interface transforms the user's request based on the persona, and forwards the request to the remote service. After receiving a response to the request, the Persona Based Interface transforms the response into a simple instant message based on the persona.

17 Claims, 5 Drawing Sheets

(56) References Cited

U.S. PATENT DOCUMENTS

| | | | | |
|---|---|---|---|---|
| 8,238,913 B1* | 8/2012 | Bhattacharyya et al. | | 455/436 |
| 9,344,862 B2* | 5/2016 | Sung | | H04L 12/5835 |
| 2001/0009016 A1 | 7/2001 | Hofmann et al. | | 709/219 |
| 2003/0013467 A1* | 1/2003 | Caloud | | 455/466 |
| 2003/0073440 A1* | 4/2003 | Mukherjee | | H04L 12/58 |
| | | | | 455/435.1 |
| 2004/0179039 A1* | 9/2004 | Blattner | | G06T 13/40 |
| | | | | 715/758 |
| 2004/0266408 A1* | 12/2004 | Maes | | 455/414.1 |
| 2005/0198147 A1* | 9/2005 | Pastro et al. | | 709/206 |
| 2006/0114885 A1* | 6/2006 | Baek | | H04W 92/02 |
| | | | | 370/352 |
| 2006/0129646 A1* | 6/2006 | Rhee | | H04L 12/581 |
| | | | | 709/206 |
| 2006/0171380 A1* | 8/2006 | Chia | | H04L 12/66 |
| | | | | 370/352 |
| 2006/0256772 A1* | 11/2006 | Yarlagadda | | 370/352 |
| 2007/0038640 A1* | 2/2007 | Mu et al. | | 707/10 |
| 2007/0050191 A1* | 3/2007 | Weider et al. | | 704/275 |
| 2007/0083675 A1* | 4/2007 | Vemulapelli et al. | | 709/246 |
| 2007/0112962 A1* | 5/2007 | Lewontin | | 709/227 |
| 2007/0116194 A1* | 5/2007 | Agapi et al. | | 379/67.1 |
| 2007/0130260 A1* | 6/2007 | Weintraub et al. | | 709/204 |
| 2007/0133510 A1* | 6/2007 | Da Palma et al. | | 370/352 |
| 2007/0207818 A1* | 9/2007 | Rosenberg et al. | | 455/461 |
| 2007/0220588 A1* | 9/2007 | Panda et al. | | 726/1 |
| 2008/0101356 A1* | 5/2008 | Babbar et al. | | 370/389 |
| 2008/0114835 A1* | 5/2008 | Mu et al. | | 709/204 |
| 2008/0132259 A1* | 6/2008 | Vin | | H04L 12/581 |
| | | | | 455/466 |
| 2008/0215694 A1* | 9/2008 | Chen | | H04L 12/5835 |
| | | | | 709/206 |
| 2009/0037999 A1* | 2/2009 | Anderson et al. | | 726/12 |
| 2009/0157816 A1* | 6/2009 | Pattan | | 709/206 |
| 2010/0004008 A1* | 1/2010 | Abolrous | | H04L 51/063 |
| | | | | 455/466 |
| 2010/0035640 A1* | 2/2010 | Lew et al. | | 455/466 |
| 2010/0087215 A1* | 4/2010 | Gu | | H04W 4/18 |
| | | | | 455/466 |
| 2010/0158097 A1* | 6/2010 | Pascal | | G06Q 10/107 |
| | | | | 375/240 |
| 2010/0162138 A1* | 6/2010 | Pascal | | G06Q 10/107 |
| | | | | 715/758 |
| 2010/0169801 A1* | 7/2010 | Blattner | | H04L 12/1822 |
| | | | | 715/758 |
| 2011/0161441 A1* | 6/2011 | Haruna et al. | | 709/206 |
| 2011/0252105 A1* | 10/2011 | Lee | | H04L 12/581 |
| | | | | 709/206 |
| 2011/0264747 A1* | 10/2011 | Mutikainen et al. | | 709/206 |
| 2013/0060871 A1* | 3/2013 | Downes | | H04L 51/04 |
| | | | | 709/206 |
| 2013/0174060 A1* | 7/2013 | Odell | | G06Q 10/107 |
| | | | | 715/758 |
| 2013/0332554 A1* | 12/2013 | Lee et al. | | 709/206 |
| 2014/0101269 A1* | 4/2014 | Oh et al. | | 709/206 |

OTHER PUBLICATIONS

Michael F. McTear et al., "Spoken Dialogue Technology: Enabling the Conversation User Interface," ACM Surveys, Mar. 2002, vol. 34, No. 1, p. 90-169, University of Ulster.

Stephanie Smale et al., "Broadcasting Information via Display Names in Instant Messaging," 2005, pp. 89-98, University of Calgary.

* cited by examiner

METHOD AND APPARATUS FOR TRANSFORMING USER REQUESTS AND RESPONSES BASED ON A PERSONA

FIELD OF THE INVENTION

The present invention relates generally to electronic data processing and specifically to transforming electronic requests and responses based on a persona.

BACKGROUND OF THE INVENTION

Multiple services allow text-based commands in a request-response format. Each of these services has different syntaxes for requests and responses. A middleware application acts as a translator, allowing a user to interact with one or more of these services using one syntax. This middleware application first converts simple requests from the user into complex commands for one or more of the multiple services, and then converts the detailed responses from the one or more of the multiple services into a simple response for the user.

One example of an middleware application, as described above, is an Instant Message Java 2 Enterprise Edition application, developed for use with IBM WebSphere Application Servers. The middleware application operates an Instant Message Framework ("IMF") and at least one Instant Message Service ("IMS"). The IMF directs instant messages to the IMS. The IMS is a translator that converts instant messaging (IM) requests into a complex command usable by a remote service, and converts the response from the remote service into a simple instant message. A separate IMS is required for each remote service accessible through the IMF. The remote service can be located on the same server as the middleware application, or can be located on another server, accessible through a local network or the Internet.

The IMF supports the Session Initiating Protocol ("SIP") which is a standardized way of managing requests and responses between multiple applications using instant messaging. SIP allows users of various IM clients, such as personal computers, cellular phones, telephone voice recognition services, etc., to access the IMF.

The IMF validates incoming instant messages, identifying instant messages that contain requests related to an IMS. If the instant message contains a request related to an IMS (called a token), the IMF forwards the instant message to the proper IMS. The IMS transforms the simple IM requests into a complex command and sends the complex command to the intended remote service. The IMS then takes the response to the complex command and converts the response into a simple instant message. The IMS sends the simple instant message back to the IMF, which directs the simple instant message to the initiating client.

As an example, a user creates the instant message "weather 75201" on a cellular phone that supports SIP and sends the instant message to the middleware application. The middleware application identifies the instant message as using SIP, and routs the message to the IMF. The IMF identifies the term "weather" as a token indicating that the message is intended for the weather IMS, so the IMF forwards the instant message to the weather IMS. The weather IMS interprets the instant message as a request for a weather forecast for the 75201 zipcode. The weather IMS transforms the request into the proper format to retrieve weather information from a remote weather website. The remote weather website returns a response to the weather IMS. The weather IMS transforms the response into a simple instant message, which is returned to the IMF. The IMF then sends the instant message containing the response back to the user's cellular phone.

Different users have different expectations and requirements for these types of IM interaction. For example, a software developer requesting the status of a particular computer server might want to know details about the memory usage, up time, and CPU usage, while an administrator requesting the status of the same computer server might only care to know that it is up and running within desired parameters. Similarly, a traveler may desire a different response to the same simple flight information request depending on where the traveler is. For example, if requesting flight information from a networked laptop computer, the traveler may want to display the weather for the destination city and a map of the airport, but the same traveler making the same request from a cellular phone may prefer a text message with just the departure time and gate number. Thus, a need exists for a way to customize how the middleware application handles simple IM requests and responses based on the personal preferences of a user.

SUMMARY OF THE INVENTION

A Persona Based Interface associates a user's persona with a simple instant message request to a remote service. When the Persona Based Interface receives a simple instant message request from a user, the Persona Based Interface transforms the user's request based on the persona, and forwards the request to the remote service. After receiving a response to the request, the Persona Based Interface transforms the response into a simple instant message based on the persona.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Persona Based Interface"

Figure 1:
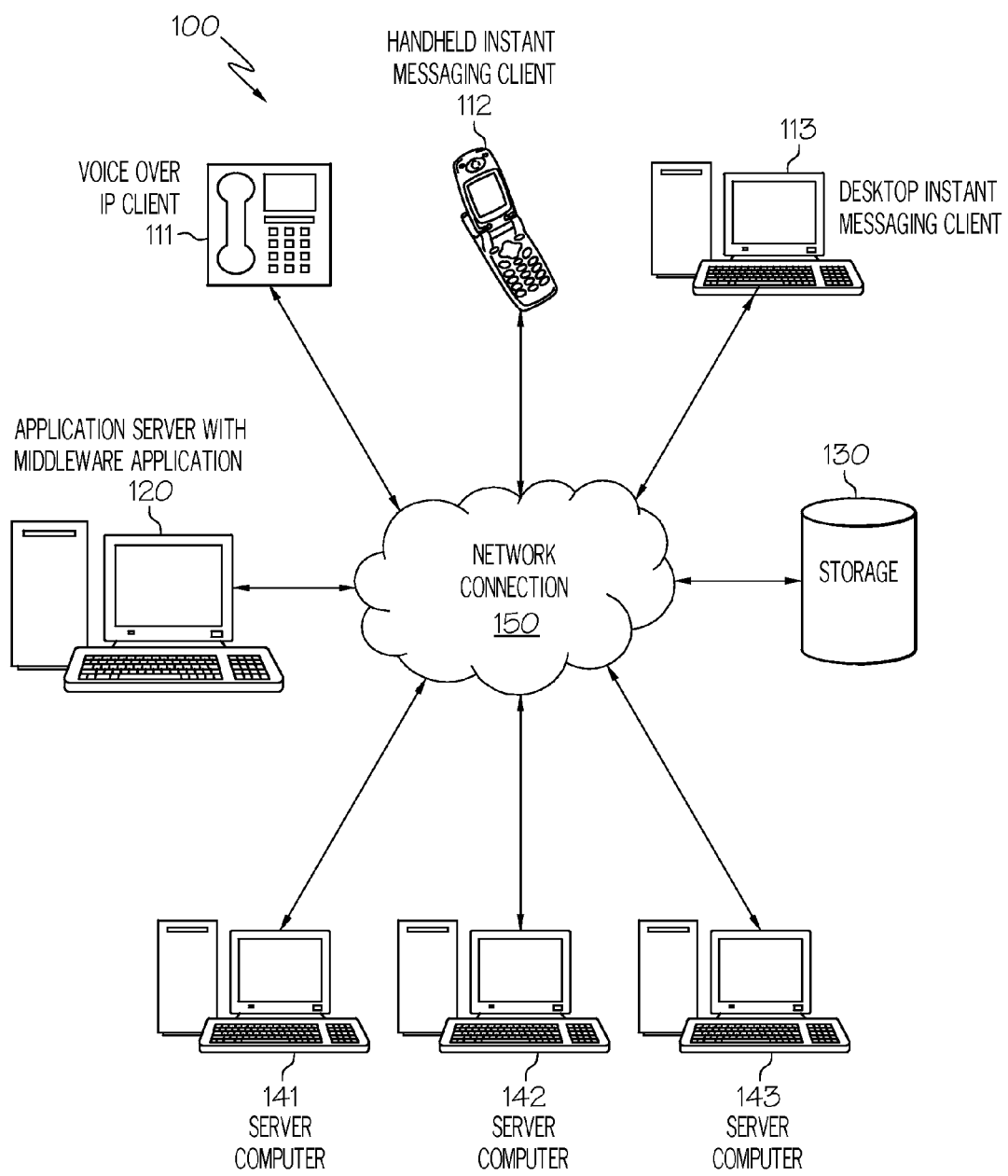
FIG. 1 is a diagram illustrating an exemplary network.

Additionally, the Persona Based Interface is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including voice over Internet Protocol (VOIP) client 111, hand-held Instant Messaging (IM) client 112, desktop Instant Messaging (IM) client 113, application server with middleware application 120, persistent storage 130, server computer 141, server computer 142, and server computer 143. Network connection 150 comprises all hardware, software, and communications media necessary to enable communication between network nodes 111-143. Unless otherwise indicated in context below, all network nodes use publicly available protocols or messaging services to communicate with each other through network connection 150.

Figure 2:
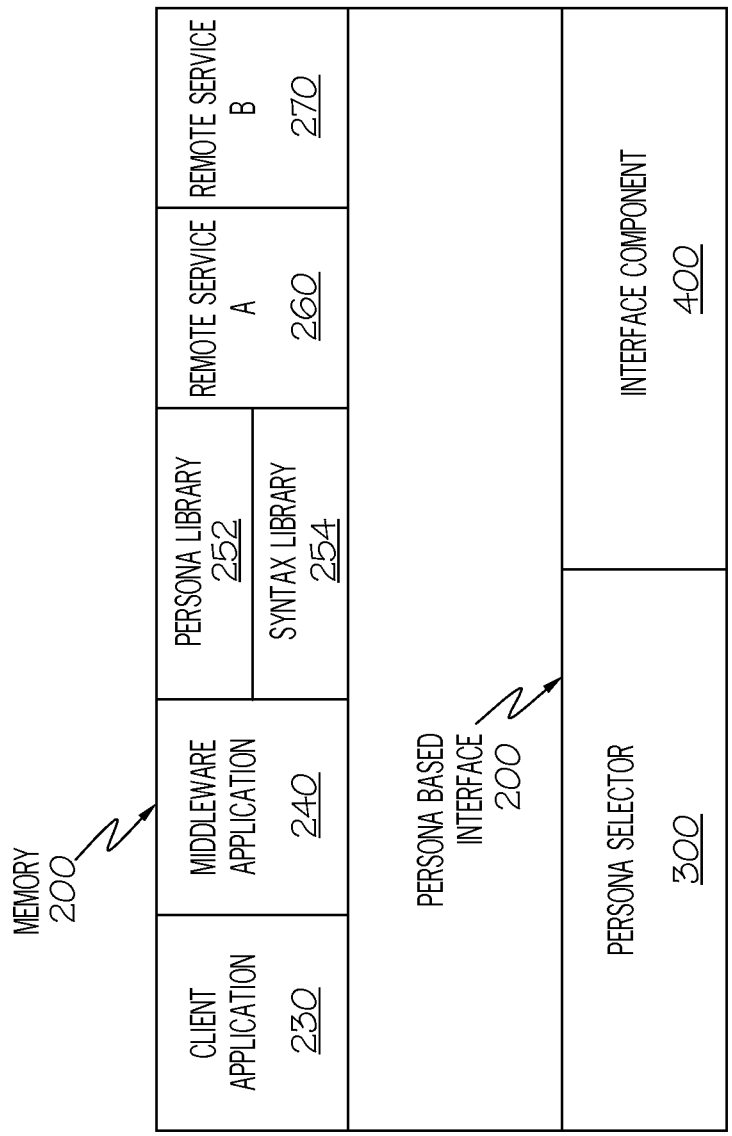
FIG. 2 illustrate files and programs in a memory.

Persona Based Interface 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, Persona Based Interface 200 may reside in more than one memory distributed across different computers, servers, logical partitions, or other hardware devices. The elements depicted in memory 220 may be located in or distributed across separate memories in any combination, and Persona Based Interface 200 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import to Persona Based Interface 200, memory 220 may include client application 230, middleware application 240, persona library 252, syntax library 254, remote service A 260, and remote service B 270 with which Persona Based Interface 200 interacts. Persona based Interface 200 has two components: Persona Selector 300 and Interface Component 400.

Client 230 can be any user interface that uses SIP, such as a VOIP phone, a cellular phone, a computer, a gaming system, or a hand-held device. Client 230 must be in electronic communication with SIP based middleware application 240. Middleware application 240 comprises an IMF portion and IMS portion as described above. Middleware application 240 resides on a computer connected to the Internet or other network, and can access persona library 252 and syntax library 254. Middleware application 240 must be capable of accessing remote service A 260 and remote service B 270. A separate IMS portion is required for remote service A 260 and remote service B 270. Remote service A 260 and remote service B 270 can be located on the same application server as middleware application 240, or on a separate server accessible by middleware application 240 via a local network or the Internet. In a preferred embodiment, Persona Based Interface 200 is a plug-in to, or fully integrated with, middleware application 240.

A user's persona has two main parts: the global persona and the service persona. The global persona includes attributes common to every IMS available to a user. An example of a global persona attribute is "language=English", indicating the default language for the user. The service persona includes attributes specific to a single IMS. A user's persona for a weather IMS might be "days=5" indicating that a weather requests should return a five-day forecast. An example of a more complex service persona is "destinationweather=yes" for an airline IMS. With this complex persona, whenever a user requests flight status information from the airline IMS, and second command is sent to the weather IMS requesting a forecast for the destination city. The responses with the flight information and weather information are combined and returned to the user based on the complex service persona.

Figure 3:
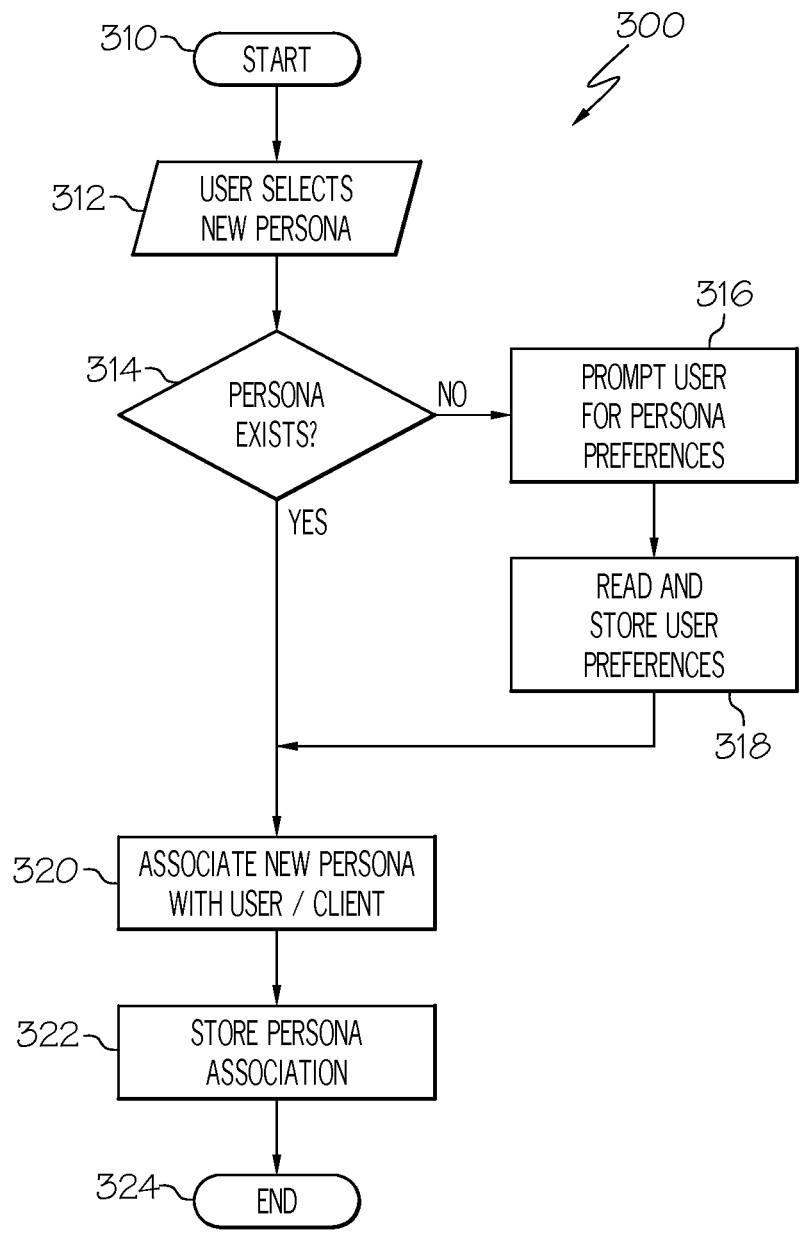
FIG. 3 is a flowchart depicting the process by which a user interacts with the application.

Referring to FIG. 3, Persona Selector 300 starts when a client application 230 accesses Persona Selector 300 (310). A user of client application 230 selects a persona to use when accessing a remote service such as remote service A 260 or remote service B 270 with middleware application 240 (312). The selection may require selecting a pre-existing persona from a menu, automatically using a pre-selected persona, or creating a new persona. Automatically using a pre-selected persona may include several additional steps not shown here, such as setting a persona based on the client type or the user's location. Creating a new persona may be performed by sending an instant message with the persona preferences to Persona Selector 300. If the user selected persona does not already exist in persona library 250 (314), Persona Selector 300 prompts the user to enter persona preferences (316). Alternatively, this prompt may be nothing more than asking the user to confirm the selection already made. Persona Selector 300 reads and stores the user's preferences to the new persona in persona library 252 (318). If the user selected persona already exists persona library 252, or after creating a new persona (314), Persona Selector 300 associates the user and/or client application 230 with the selected persona (320). Persona Selector 300 stores the persona association in persona library 252 (322) and stops (324).

Figure 4:
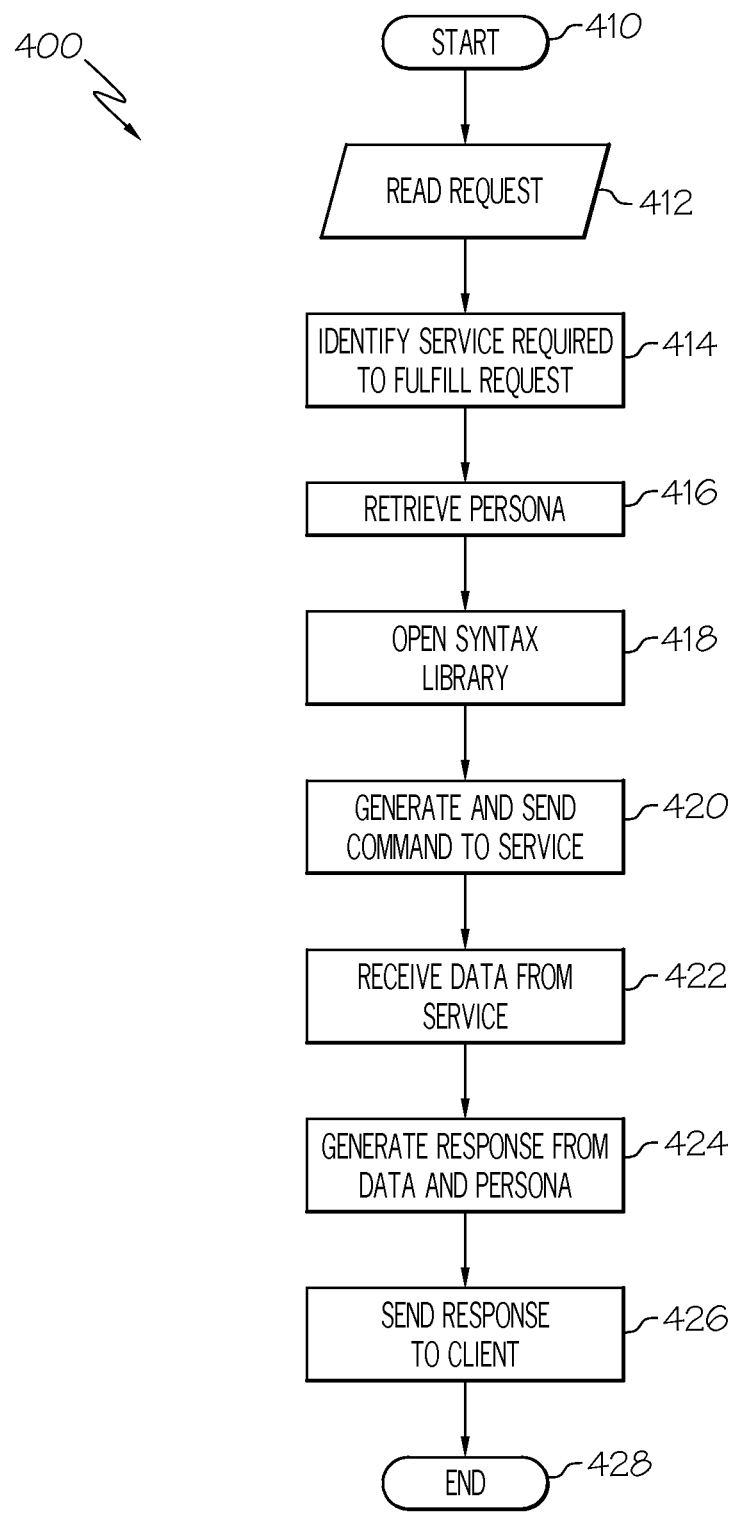
FIG. 4 is a flowchart of the selection of a persona.

Referring to FIG. 4, Interface Component 400 starts whenever the user of client application 230 makes a request intended for a remote service such as remote service A 260 or remote service B 270 with middleware application 240. After the IMF portion of middleware application 240 identifies a remote service required to fulfill the request (414), Interface Component 400 retrieves the user's persona from persona library 252 (416). If no persona is defined for the user, a default persona is used. The IMS portion of middleware application 240 opens syntax library 254 (418) and generates a command (or set of commands) based on the persona, the required remote service (or services) and the syntax for the remote service (or services) (420). The IMS portion of middleware application 240 receives data from the remote service (or services) (422) and Interface Component 400 generates a response based on the data and the formatting requirements of the persona (424). After middleware application 240 sends the response to the client (426), Interface Component 400 stops (428).

Figure 5:
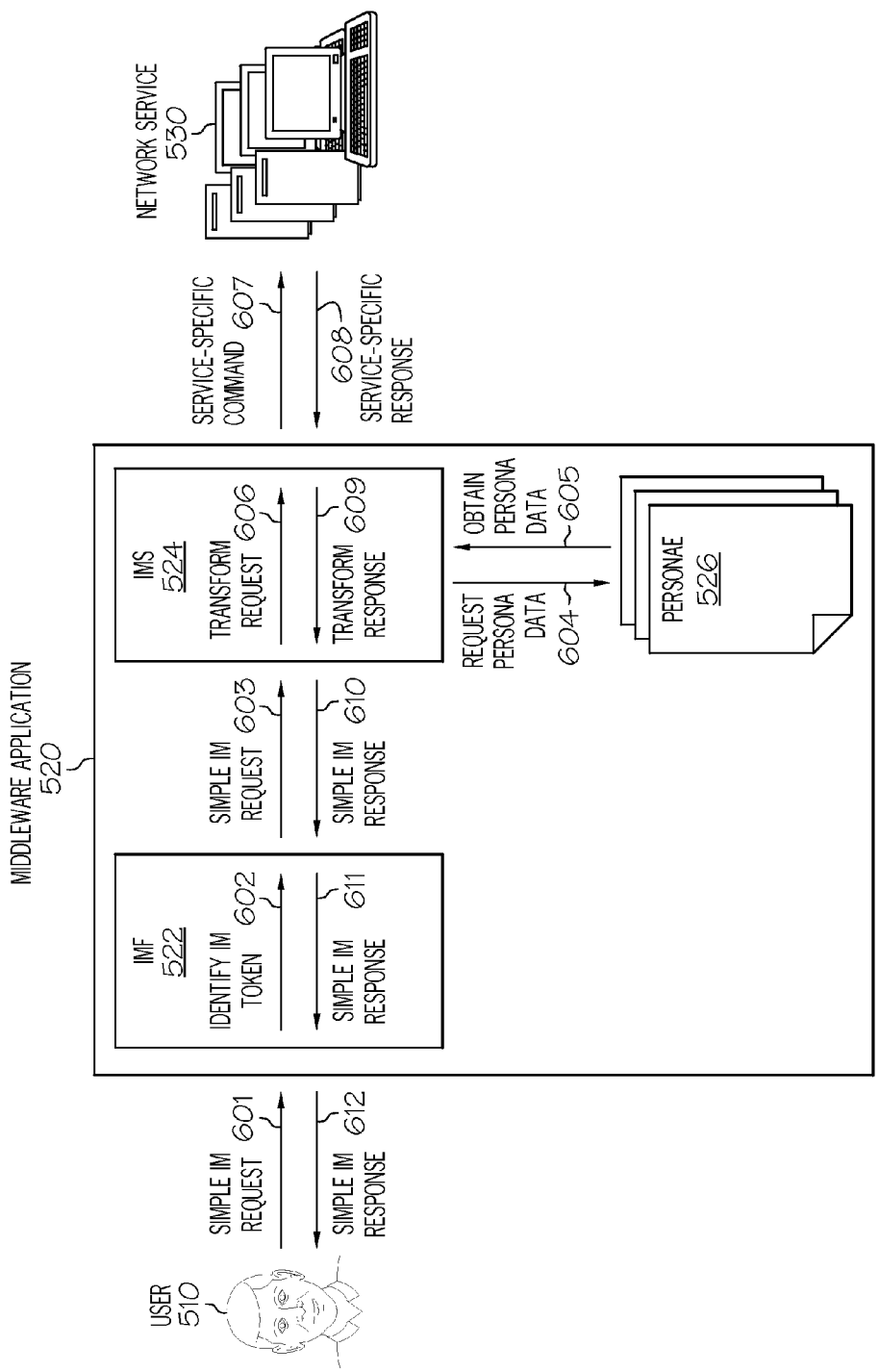
FIG. 5 illustrates the interactions between a user, a middleware application, and a remote network service.

FIG. 5 shows the interactions between user 510, middleware application 520 running Persona Based Interface 200, and network service 530. Operation 601 represents user 510 sending a simple IM request to middleware application 520. Operation 602 represents IMF 422 identifying a token in the IM requests intended for network service 530. Operation 603 represents IMF 522 forwarding the simple IM request to IMS 524, the IMS related to network service 530. Operation 604 represents IMS 524 requesting persona data from persona 526 related to user 510. Operation 605 represents IMS 524 receiving persona data from persona 524. Operation 606 represents IMS 524 transforming the simple IM request into a service-specific command. Operation 607 represents IMS 524 sending the service-specific command based on persona 524 to network service 530. Operation 608 represents network service 530 sending a service-specific response to IMS 524. Operation 609 represent IMS 524 transforming the service-specific response into a simple IM response based on persona 524. Operation 610 represents IMS 524 sending the simple IM response to IMF 522. Operation 611 represents IMF 522 routing the simple IM response to user 510. Operation 612 represents user 510 receiving the simple IM response.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for obtaining information from a network service, the computer implemented process comprising:
   receiving a session initiating protocol (SIP) utilized Simple instant message (IM) request embedded within an IM in an IM server from an IM client of a user over a computer communications network;
   determining from the request a current persona for the user;
   selecting a network service to fulfill the simple IM request, transforming the simple IM request into a command for the selected network service in a command syntax of the selected network service based upon the determined current persona so that the command includes command parameters corresponding to the determined current persona, and sending the command to the selected network service;
   receiving a response from the network service in the IM server;
   transforming the response into a simple IM response that is formatted based upon formatting requirements of the current persona; and
   sending the simple IM response embedded within an IM from the IM server to the IM client of the user.

2. The computer implemented process of claim 1 wherein the simple IM request is from an instant messaging client supporting SIP.

3. The computer implemented process of claim 1 wherein the simple IM request is from a voice over IP client supporting SIP.

4. The computer implemented process of claim 1 wherein transmissions to and from the network services are sent via an instant messaging protocol.

5. The computer implemented process of claim 1 wherein a plurality of detailed commands are generated from the simple IM request, and a plurality of detailed responses are transformed into a single simple IM response.

6. The computer implemented process of claim 5 wherein the plurality of detailed commands are sent to a plurality of network services.

7. An apparatus for obtaining information from a network service, the apparatus comprising:
   a processor;
   a memory connected to the processor;
   a file in the memory containing data defining a user persona;
   a file in the memory containing a library of command syntaxes;
   an IM server executing in the memory by the processor;
   a middleware application capable of sending and receiving instant messages to and from a user and network services;
   a network for communicating with network services;
   a persona based interface program adapted to:
      receive a session initiating protocol (SIP) utilized Simple instant message (IM) request embedded within an IM in the IM server from an IM client of a user over the network;
      determine from the request a current persona for the user;
      select a network service to fulfill the simple IM request, transform the simple IM request into a command for the selected network service in a command syntax of the selected network service based upon the determined current persona so that the command includes command parameters corresponding to the determined current persona, and send the command to the selected network service;
      determine a current persona for the user;
      transform the detailed response from the network service into a simple IM response that is formatted based on formatting requirements of the current persona; and
      send the simple IM response embedded within an IM from the IM server to the IM client of the user.

8. The apparatus of claim 7 wherein the simple IM request is from an instant messaging client supporting SIP.

9. The apparatus of claim 7 wherein the simple IM request is from a voice over IP client supporting SIP.

10. The apparatus of claim 7 wherein transmissions to and from the network services are sent via an instant messaging protocol.

11. The apparatus of claim 7 wherein a plurality of detailed commands are generated from the simple IM request, and a plurality of detailed responses are transformed into a single simple IM response.

12. The apparatus of claim 11 wherein the plurality of detailed commands are sent to a plurality of network services.

13. A non-transitory computer readable memory containing a plurality of instructions to cause a computer to obtain information from a network service, the plurality of instructions comprising:
   a first instruction to receive a session initiating protocol (SIP) utilized Simple instant message (IM) request embedded within an IM in an IM server from an IM client of a user over a computer communications network;

a second instruction to determine from the request a persona for the user;

a third instruction to select a network service to fulfill the simple IM request, to transform the simple IM request into a command for the selected network service in a command syntax of the selected network service based upon the determined current persona so that the command includes command parameters corresponding to the determined current persona, and to send the command to the selected network service;

a sixth instruction to receive a response from the network service in the IM server;

a seventh instruction to transform the response into a simple IM response that is formatted based upon the formatting requirements of the current persona; and an eighth instruction to send the simple IM response embedded within an IM from the IM server to the IM client of the user.

14. The computer readable memory of claim 13 wherein the simple IM requests is from an instant messaging client supporting SIP.

15. The computer readable memory of claim 13 wherein the simple IM requests is from a voice over IP client supporting SIP.

16. The computer readable memory of claim 13 wherein transmissions to and from the network services are sent via an instant messaging protocol.

17. The computer readable memory of claim 13 wherein the fourth instruction generates a plurality of detailed commands from the simple IM request, the fifth instructions sends the plurality of detailed commands are sent to a plurality of network services, and the seventh instruction transforms a plurality of detailed responses into a single simple IM response.

* * * * *